C. SEAGREN.
GRAIN SEPARATOR.
APPLICATION FILED MAY 14, 1912.
1,044,086.
Patented Nov. 12, 1912.
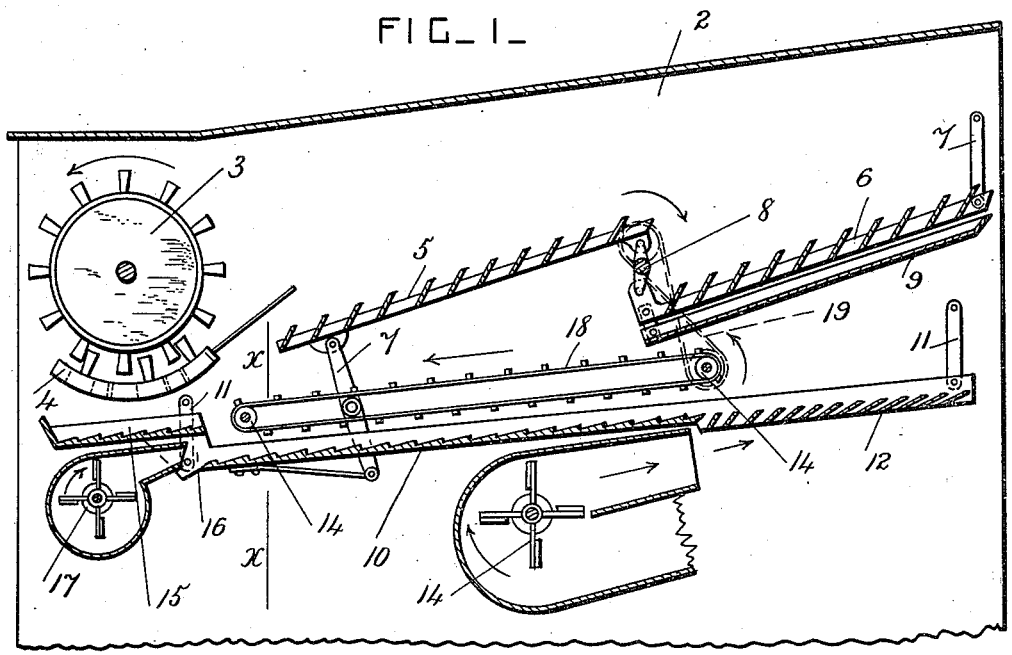
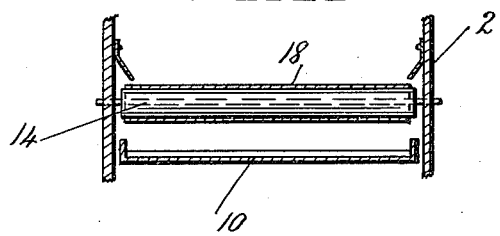
Witnesses
A. E. Davis.
Walter Allen
Inventor
Charles Seagren,
By Herbert W. J. Jenner.
Attorney

UNITED STATES PATENT OFFICE.

CHARLES SEAGREN, OF HOLDREGE, NEBRASKA.

GRAIN-SEPARATOR.

1,044,086.

Specification of Letters Patent.

Patented Nov. 12, 1912.

Application filed May 14, 1912. Serial No. 697,161.

*To all whom it may concern:*

Be it known that I, CHARLES SEAGREN, a citizen of the United States, residing at Holdrege, in the county of Harlan and State of Nebraska, have invented certain new and useful Improvements in Grain-Separators; and I do hereby declare the following to be a full, clear, and exact description of the invention, such as will enable others skilled in the art to which it appertains to make and use the same.

This invention relates to grain separators provided with shaking straw racks and grain bottoms; and it consists in the novel construction and combination of the parts hereinafter fully described and claimed.

In the drawings, Figure 1 is a longitudinal section through portions of a grain separator constructed according to this invention. Fig. 2 is a cross-section, taken on the line $x$—$x$ in Fig. 1.

The grain separator is provided with a casing 2, and a threshing cylinder 3 and a concave 4, of any approved construction are arranged at the inlet end of the casing.

A front straw rack 5 and a rear straw rack 6 are arranged longitudinally in the upper part of the casing, and are supported by suitable links 7. A crankshaft 8 is provided for reciprocating the straw racks, and for imparting a tossing motion to the straw which passes rearwardly over them. The straw racks are provided with slats in the usual way, and 9 is a return bottom secured under the rear straw rack 6, and arranged with it in an upwardly and rearwardly inclined position.

A grain bottom 10 is suspended by links 11 under the front straw rack 5, and has a serrated bottom for working the grain rearwardly. This grain bottom is reciprocated by any approved driving mechanism. A slatted chaffer 12, or chaff screen, is secured to the rear end of the grain bottom in line with its main portion, and this chaffer projects under the return bottom 9.

A main fan or blower 14 is arranged below the rear end portion of the grain bottom, and drives a blast of air upwardly and rearwardly through the slats of the chaffer.

The front end portion 15 of the grain pan forms a shelf which is arranged above the level of the main portion of the grain pan or grain bottom, and an air opening 16 is formed between the shelf 15 and the main portion of the grain bottom. An auxiliary fan or blower 17 is arranged under the shelf 15, and is provided with a delivery passage which drives a blast of air through the opening 16 over the main portion of the grain bottom.

A grain conveyer 18 is arranged in the casing 2 between the front straw rack and the grain bottom. This conveyer 18 consists of an endless apron which passes over rollers 14 which are journaled in the casing. This conveyer is driven in the direction of the arrow in Fig. 1, adjacent to it, from the crankshaft 8, by any intermediate driving mechanism 19. The rear end of the conveyer projects under the front and lower end of the return bottom 9, and the conveyer extends under the front straw rack to the front end of the main portion of the grain bottom, and its front end is arranged a little to the rear of and above the level of the rear end of the shelf 15. The conveyer 18 is arranged above the whole of the main portion of the grain bottom, and the chaffer 12 is arranged to project beyond the rear end of the conveyer, so that the chaff is blown out at the rear end of the casing 2 without meeting any obstruction.

All the material which falls from the two straw racks is delivered onto the conveyer 18, the grain from the rear straw rack being caught by the return bottom 9 and delivered onto the rear end of the conveyer. The conveyer delivers all the grain and chaff onto the front end portion of the main part of the grain bottom. The grain flying from the cylinder and concave, and falling onto the shelf 15 of the grain bottom, is also delivered onto the main portion of the grain bottom, and the grain and chaff are operated on at this point by the blast of air from the auxiliary fan 17.

The grain and chaff pass over the main portion of the grain bottom to the chaffer, at which the chaff is blown out of the machine by the main fan 14. The grain and chaff are fed very evenly to the chaffer. The material falls intermittently from the straw racks, and spreads itself out upon the conveyer owing to the jar and vibration of the machine. The material is further spread and distributed more evenly by the grain bottom, and is fed to the chaffer in a very uniform stream, with the result that a considerable saving of grain is effected, and the grain is more thoroughly separated from the chaff, and is less liable to be blown out of the machine with the chaff.

What I claim is:

1. In a grain separator, the combination, with a shaking straw rack, a grain bottom, and a chaffer which receives the material from the grain bottom; of an endless return conveyer arranged between the said straw rack and the grain bottom in front of the said chaffer and operating to receive the material which falls from the straw rack and to discharge it onto the front end portion of the grain bottom.

2. In a grain separator, the combination, with a shaking straw rack, and a shaking grain bottom and a chaffer, said chaffer being connected to the rear end of the grain bottom and arranged in line with it; of an endless return conveyer arranged between the said straw rack and the grain bottom in front of the said chaffer and operating to receive the material which falls from the straw rack and to discharge it onto the front end portion of the grain bottom.

3. In a grain separator, the combination, with a front straw rack and a rear straw rack, said rear straw rack having an inclined return bottom secured to its underside, of a grain bottom arranged under the front straw rack, a chaffer for receiving the material from the grain bottom, means for reciprocating all the said parts, and an endless return conveyer arranged between the front straw rack and the grain bottom in front of the said chaffer with its rear end projecting under the front end of the said return bottom, said conveyer operating to receive the material which falls from the straw racks and to discharge it onto the front end portion of the grain bottom.

4. In a grain separator, the combination, with a front straw rack and a rear straw rack, and a grain bottom and a chaffer arranged under the respective straw racks; of an endless return conveyer arranged between the straw racks and the grain bottom and extending from a point in front of the front end of the front straw rack to the front end portions of the rear straw rack and the chaffer, leaving the chaffer unobstructed, and operating to deliver grain from the said straw racks onto the front end portion of the grain bottom, and a return bottom for guiding the grain from the rear straw rack onto the rear end portion of the said return conveyer.

5. In a grain separator, the combination, with a shaking straw rack, a grain bottom, and a chaffer which receives the material from the grain bottom; of a blower having its delivery passage arranged above the front end of the grain bottom, and an endless return conveyer arranged between the said straw rack and the grain bottom in front of the said chaffer and operating to receive the material which falls from the straw rack and to discharge it onto the front end portion of the grain bottom in the path of the blast from the said blower.

6. In a grain separator, the combination, with a shaking straw rack, a grain bottom having a shelf at its front end portion above the level of its main portion and forming an opening, and a chaffer which receives the material from the grain bottom; of a blower having its delivery passage arranged in front of the said opening, and an endless return conveyer arranged between the said straw rack and the grain bottom in front of the said chaffer and operating to receive the material which falls from the straw rack and to discharge it onto the main portion of the grain bottom adjacent to the said opening and in the path of the blast from the said blower.

In testimony whereof I have affixed my signature in the presence of two witnesses.

CHARLES SEAGREN.

Witnesses:
ALBERT ANDERSON,
C. H. BLACK.

---

Copies of this patent may be obtained for five cents each, by addressing the "Commissioner of Patents, Washington, D. C."